United States Patent
Ohmori et al.

(10) Patent No.: US 11,623,306 B2
(45) Date of Patent: Apr. 11, 2023

(54) BRAZING FILLER MATERIAL FOR BONDING IRON-BASED SINTERED MEMBER, AND METHOD FOR PRODUCING IRON-BASED SINTERED PART

(71) Applicant: Showa Denko Materials Co., Ltd., Tokyo (JP)

(72) Inventors: Hiroshi Ohmori, Tokyo (JP); Yuji Yamanishi, Tokyo (JP); Tadayuki Tsutsui, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 17/283,818

(22) PCT Filed: Oct. 4, 2019

(86) PCT No.: PCT/JP2019/039360
§ 371 (c)(1),
(2) Date: Apr. 8, 2021

(87) PCT Pub. No.: WO2020/075648
PCT Pub. Date: Apr. 16, 2020

(65) Prior Publication Data
US 2021/0339345 A1    Nov. 4, 2021

(30) Foreign Application Priority Data
Oct. 9, 2018   (JP) .............................. JP2018-190988

(51) Int. Cl.
*B23K 35/30* (2006.01)
*B22F 7/06* (2006.01)
(Continued)

(52) U.S. Cl.
CPC ............ *B23K 35/3033* (2013.01); *B22F 7/06* (2013.01); *B22F 7/062* (2013.01);
(Continued)

(58) Field of Classification Search
CPC ...... B23K 35/302–3033; C22C 1/0425; C22C 1/0433; C22C 23/00–06; C22C 19/00–058; C22C 9/05; C22C 9/06
See application file for complete search history.

(56) References Cited

U.S. PATENT DOCUMENTS 4,003,715 A * 1/1977 Cascone .............. B23K 35/302
                                                    420/482
4,631,171 A * 12/1986 McDonald ............ C04B 37/026
                                                    420/481
(Continued)

FOREIGN PATENT DOCUMENTS

JP    H-0215875 A   *  1/1990
JP    2009-233720 A    10/2009
(Continued)

OTHER PUBLICATIONS

Chem Libre; "Chemistry of Manganese." 2020. Aug. 21, 2020. https://chem.libretexts.org/@go/page/644, retrieved from internet on Mar. 9, 2022 (Year: 2020).*

(Continued)

*Primary Examiner* — Kevin E Yoon
*Assistant Examiner* — Austin Pollock
(74) *Attorney, Agent, or Firm* — Fitch, Even, Tabin & Flannery, LLP (57) ABSTRACT

Provided is a brazing filler material for bonding iron-based sintered member that includes a sintered compact containing Cu, Mn, and a remainder of Ni and unavoidable impurities, and an oxide film formed on a surface of the sintered compact. An oxygen concentration may account for not less than 0.1% by mass of a total amount of the brazing filler material. The oxide film may contain Mn.

9 Claims, 4 Drawing Sheets

(51) Int. Cl.
*C22C 1/04* (2006.01)
*C22C 19/03* (2006.01)
*B23K 35/02* (2006.01)

(52) U.S. Cl.
CPC ........ *B23K 35/0244* (2013.01); *C22C 1/0433* (2013.01); *C22C 19/03* (2013.01); *B22F 2301/15* (2013.01); *B22F 2301/35* (2013.01)

(56) References Cited

U.S. PATENT DOCUMENTS

| | | | |
|---|---|---|---|
| 6,605,371 B1 * | 8/2003 | Ueda | B23K 35/3033 428/677 |
| 11,123,825 B2 * | 9/2021 | Steigerwald | B23K 1/002 |
| 2003/0062396 A1 | 4/2003 | Kovacich | |
| 2012/0148440 A1 * | 6/2012 | Itoh | B23K 35/3033 420/587 |

FOREIGN PATENT DOCUMENTS

| | | | |
|---|---|---|---|
| JP | 2009233720 A | * | 10/2009 |
| JP | 2011056533 A | * | 3/2011 |

OTHER PUBLICATIONS

EESemi, "Electrode Reduction and Oxidation Potential"; https://www.eesemi.com/ox_potential.htm; retrieved from internet on Mar. 9, 2022 (Year: 2022).*

* cited by examiner

BEI

BRAZING FILLER MATERIAL FOR BONDING IRON-BASED SINTERED MEMBER, AND METHOD FOR PRODUCING IRON-BASED SINTERED PART

CROSS-REFERENCE TO RELATED APPLICATIONS

This application is a U.S. national phase application filed under 35 U.S.C. § 371 of International Application No. PCT/JP2019/039360, filed Oct. 4, 2019, designating the United States, which claims priority from Japanese Application No. 2018-190988, filed Oct. 9, 2018, which are hereby incorporated herein by reference in their entirety.

TECHNICAL FIELD

The present invention relates to a brazing filler material for bonding iron-based sintered member and a method for producing an iron-based sintered part.

BACKGROUND ART

A powder metallurgy method in which a metal powder is compacted and the obtained green compact is sintered, enables performing compacting into a near-net shape, and the method can be adopted to a method for producing various machine parts because the method is suitable for mass production.

In the powder metallurgy method, a green compact is usually prepared by using a green compact die formed of a die, an upper punch and a lower punch. In this method, it is difficult to compact a part with a shape of an undercut because a uniaxial compacting is performed from an upper direction and a lower direction. Therefore, when a part with the shape of the undercut is to be produced, the part is divided into a plurality of members, each having a shape in which compacting by uniaxial compacting is possible, the individual members of the shape are compacted, and then the plurality of members are combined and bonded.

Examples of the method for bonding the plurality of members include the sintering diffusion bonding, brazing bonding and the like.

An example of the brazing filler material used for bonding iron-based sintered members by brazing is Cu—Ni—Mn based alloy. In a case of the brazing filler material using Cu—Ni—Mn based alloy, even if the molten brazing filler material is infiltrated in the pores of the iron-based sintered members, the molten brazing filler material can react with Fe in the iron-based sintered members and can be solidified by the increase of a melting point by the reaction, and accordingly, further infiltration can be suppressed. The brazing filler material can reduce the amount of the brazing filler material to be absorbed in the pores and increase the amount of the brazing filler material that is remained at a bonding site, and thus, the brazing filler material can be preferably used for bonding the iron-based sintered members.

As an example of a brazing method, there is a method of applying the heat treatment by applying, to a brazing site of the member to be bonded, a paste-like brazing filler material in which particles of alloy powder are dispersed in the solvent. In this method, in order to remove the solvent and additives contained in the paste-like brazing filler material, problems may be raised in the setting of heat treatment conditions, treatment of exhaust gas, and the like.

Another example of the brazing method is a method in which the heat treatment is performed by arranging a brazing filler material which is a sintered compact formed by compacting alloy powder and applying the heat treatment at or near the brazing site of the member to be bonded.

In this method, the brazing filler material has already been subjected to the heat treatment, and thus, the heat treatment in a brazing process can be performed more simply. In addition, when a solid brazing filler material is melted in the brazing process, the brazing filler material can be infiltrated in an interface of the member to be bonded, and accordingly, the bonding strength can be enhanced.

Patent Document 1 (U.S. 2003/0062396 A1) discloses the production of a brazed compact for brazing metal components produced based on a powder metallurgy method by liquid phase sintering a filler metal having alloy powder containing Cu, Mn and Ni. Patent Document 1 discloses that the excessive infiltration of the brazing filler material into pores of the metal components can be prevented by compacting into the brazing filler material in advance.

Patent Document 2 (JP 2009-233720 A) discloses that the limitation of the amount of oxygen in the brazing filler material for bonding iron-based sintered member containing Cu—Ni—Mn based alloy to account for not more than 0.1% by mass of a total amount, can prevent the occurrence of the bonding failure due to the oxidation and sulfidizing of Mn in Cu—Ni—Mn based alloy. In Patent Document 2, by limiting the amount of oxygen in the brazing filler material, the bonding of oxygen and Mn in the brazing filler material can be prevented, and the variation in the Mn concentration in the brazing filler material can be prevented. The molten state of the brazing filler material can be caused to be uniform by suppressing the occurrence of MnO and making the Mn concentration uniform.

CITATION LIST

Patent Literature

Patent Document 1: U.S. 2003/0062396 A1
Patent Document 2: JP 2009-233720 A

SUMMARY OF THE INVENTION

Technical Problem

When the heat treatment is applied to the brazing filler material together with the member to be bonded in the brazing process, impurity components may come into contact with the brazing filler material from a furnace atmosphere, a furnace material, a member to be bonded, and the like. Among the impurity components, an S component may be combined with the metal component in the brazing filler material to form metal sulfide. For example, in a stage of the heat treatment, if the S component comes into contact with the brazing filler material and Mn in the brazing filler material and the S component are combined, MnS may occur on a surface of the brazing filler material. The occurrence of MnS may decrease the amount of Mn in the brazing filler material and increase a melting point, and thus, MnS may act to inhibit the melting of the brazing filler material when the heat treatment is performed in the brazing process.

Although Patent Document 1 discloses the brazing filler material using Cu—Ni—Mn based alloy, the possibility that the metal component contained in the brazing filler material is affected by oxidation or sulfidizing is not studied.

Patent Document 2 discloses the brazing filler material using Cu—Ni—Mn based alloy, and the amount of oxygen in the brazing filler material is limited in order to prevent bonding of oxygen and Mn in the brazing filler material. On the other hand, even if the amount of oxygen in the brazing filler material is limited, a problem may be raised that the brazing filler material may be affected by the impurity components, especially the S component adhered from the outside during the heat treatment process.

One of objects of the present invention is to improve the bondability by brazing iron-based sintered members.

Solution to Problem

One of embodiments is summarized as follows.
[1] A brazing filler material for bonding iron-based sintered member, having a sintered compact containing Cu, Mn, and a remainder of Ni and unavoidable impurities, and an oxide film formed on a surface of the sintered compact.
[2] The brazing filler material for bonding iron-based sintered member according to [1], wherein an oxygen concentration accounts for not less than 0.1% by mass of a total amount of the brazing filler material.
[3] The brazing filler material for bonding iron-based sintered member according to [1] or [2], wherein the oxide film contains Mn.
[4] A method for producing an iron-based sintered part, comprising: providing the brazing filler material for bonding iron-based sintered member according to any one of [1] to [3], and producing an iron-based sintered part comprising a plurality of iron-based sintered members bonded by using the brazing filler material.

Advantageous Effects of Invention

According to one of embodiments, the bondability by brazing of iron-based sintered members can be improved.

BRIEF DESCRIPTION OF DRAWINGS

Each of FIG. 5A to FIG. 5F is an electron beam analyzer image of a cross section of a brazing filler material of Example 6.

DESCRIPTION OF EMBODIMENTS

The present invention is described below with reference to a series of embodiments. The present invention is not limited to the exemplification of the following embodiments.

The brazing filler material for bonding iron-based sintered member according to one embodiment includes a sintered compact that contains Cu, Mn, and a remainder of Ni and unavoidable impurities, and an oxide film that is formed on a surface of the sintered compact.

This can improve the bondability of the iron-based sintered member in brazing the iron-based sintered member.

Hereinafter, a member to be brazed may be referred to as a member to be bonded.

In a brazing process, a brazing filler material is heated by performing a heat treatment. During the process, if an S component comes into contact with the brazing filler material from furnace atmosphere, furnace walls, a mesh belt, a mesh net, other furnace materials, the member to be bonded, or the like, a metal component in the brazing filler material and the S component may be combined to form metal sulfide. The formation of MnS may cause the amount of Mn in the brazing filler material to be decreased and cause a melting point of the brazing filler material to be raised, which acts to inhibit the melting of the brazing filler material. In the brazing filler material according to one embodiment, the oxide film is formed on the surface of the sintered compact, and this can act to inhibit the sintered compact in the brazing filler material from coming into contact with the S component, and the formation of MnS can be suppressed. If Mn is contained in the oxide film, MnO can be formed from Mn and O. MnO has lower free energy of formation than MnS, and this can reduce an influence of sulfur on the melting of the brazing filler material when the heat treatment is performed during the brazing process.

In the brazing filler material according to one embodiment, the oxide film is formed on the surface of the sintered compact.

In the brazing filler material according to one embodiment, it is preferable that the sintered compact contains Cu, Mn, and a remainder of Ni and unavoidable impurities. The composition of the sintered compact is described below.

Cu can be blended to increase the bonding strength during brazing. The amount of Cu preferably accounts for not less than 10% by mass of the total amount of the sintered compact, more preferably accounts for not less than 20% by mass of the total amount, and still more preferably accounts for not less than 30% by mass of the total amount. The amount of Cu preferably accounts for not more than 50% by mass of the total amount of the sintered compact, more preferably accounts for not more than 45% by mass of the total amount, and still more preferably accounts for not more than 40% by mass of the total amount. For example, the amount of Cu preferably accounts for 10 to 50% by mass of the total amount of the sintered compact, more preferably accounts for 20 to 45% by mass of the total amount, and may be 30 to 40% by mass of the total amount.

Further, it is preferable that Cu is contained in the sintered compact by accounting for preferably 35 to 45% by mass of the total amount of the sintered compact. When the amount of Cu accounts for not less than 35% by mass of the total amount of the sintered compact, the bonding strength during brazing can be further increased. If the amount of Cu becomes excessive, the brazing filler material may melt at a lower temperature, and accordingly, the molten brazing filler material may be absorbed into the pores of the iron-based sintered member by capillary force, the amount of the brazing filler material at a brazing site may be decreased, and the bonding strength may be lowered. Therefore, the amount of Cu preferably accounts for not more than 45% by mass of the total amount Mn can be blended to improve the fluidity of the molten brazing filler material. Mn preferably accounts for not less than 1% by mass of the total amount of the sintered compact, more preferably accounts for not less than 5% by mass of the total amount, and still more preferably accounts for not less than 10% by mass of the total amount. Mn preferably accounts for not more than 30% by mass of the total amount of the sintered compact, more preferably accounts for not more than 25% by mass of the total amount, and still more preferably accounts for not more than 20% by mass of the total amount. For example, Mn preferably accounts for 1 to 30% by mass of the total amount of the sintered compact, more preferably accounts for 5 to 25% by mass of the total amount, and may be 10 to 20% by mass of the total amount.

Further preferably, Mn is contained in the sintered compact by accounting for 12 to 20% by mass of the total amount of the sintered compact. When the amount of Mn accounts for not less than 12% by mass of the total amount of the sintered compact, the fluidity of the molten brazing filler material can be further improved. If the amount of Mn becomes excessive, the erosion to the iron-based sintered member by the reaction with Fe may be increased, and this may lead to the reduction in the dimensional accuracy or the like of the iron-based sintered member. Therefore, the amount of Mn preferably accounts for not more than 20% by mass of the total amount.

The sintered compact may further contain Fe. Fe is preferably contained in the sintered compact by accounting for not more than 21% by mass of the total amount of the sintered compact, and more preferably, the amount of Fe accounts for not more than 20% by mass of the total amount. Fe can be added to adjust the viscosity, the melting point, and the like of the sintered compact of the brazing filler material depending on the material, and the density of the iron-based sintered member to be bonded, the furnace atmosphere and the like. The addition of Fe increases the melting point of the sintered compact of the brazing filler material and also increases the melt viscosity of the sintered compact, and thus, when the low-density iron-based sintered member with many pores is brazed, it is possible to prevent the brazing filler material from infiltrating into the pores of the iron-based sintered member, and the reduction in the amount of the brazing filler material at the brazing site can be prevented.

If the amount of Fe becomes excessive, the melt viscosity of the brazing filler material may be increased, and the brazing filler material may not be sufficiently wetted and spread at a bonding interface, and the bondability may be lowered. Therefore, the amount of Fe more preferably accounts for not more than 15% by mass of the total amount.

The remainder is preferably Ni. The remainder may contain unavoidable impurities. Examples of the unavoidable impurities include B, Si, O, N, S and the like, or a combination thereof.

Each of B and Si acts so as to improve the fluidity of the brazing filler material, and thus, B and Si may be contained in the sintered compact with the total amount of B and Si accounting for not more than 5% by mass of the total amount of the sintered compact. If the total amount of B and Si accounts for not more than 5% by mass of the total amount of the sintered compact, the erosion on the iron-based sintered member to be bonded can be prevented. For example, it is preferable if the amount of B accounts for 0.1 to 5% by mass of the total amount of the sintered compact, and it is more preferable if the amount of B accounts for 1 to 3% by mass of the total amount of the sintered compact. It is preferable if the amount of Si accounts for 0.1 to 5% by mass of the total amount of the sintered compact, and is more preferable if the amount of Si accounts for 1 to 3% by mass of the total amount of the sintered compact. The total amount of B and Si preferably accounts for 0.1 to 5% by mass of the total amount of the sintered compact and more preferably accounts for 1 to 3% by mass of the total amount of the sintered compact.

The remainder may also contain O as an unavoidable impurity. If an excessive amount of O is blended to the sintered compact, Mn and O are combined, which are among raw materials of the sintered compact, a portion with a low Mn concentration and a high melting point may be caused in the sintered compact, and a problem may be raised that a molten state of the brazing filler material becomes uneven. Therefore, if the sintered compact of the brazing filler material contains O, the oxygen concentration is preferably limited to not more than 0.1% by mass, and the sintered compact may not contain O The oxygen (O) concentration in the sintered compact of the brazing filler material is the total amount of oxygen in a free state and oxygen in a bonding state, which are contained in the sintered compact. The oxygen concentration in the sintered compact can be measured based on an infrared absorption method. Specifically, the oxygen concentration in the sintered compact can be obtained by melting a sample put into a graphite crucible in an inert gas such as He with Joule heat by a large current load, causing the graphite crucible to be reacted with oxygen in the sample, extracting the reactant as carbon dioxide gas, measuring the amount of carbon dioxide gas extracted based on the infrared absorption method, and calculating the oxygen concentration from the amount of carbon dioxide gas.

For this measurement, for example, an oxygen analyzer "TC-600" produced by LECO JAPAN CORPORATION may be used.

In the brazing filler material according to one embodiment, the oxide film is formed on the surface of the sintered compact.

The oxide film preferably contains Mn. In the oxide film, Mn can be combined with O and can present as MnO. MnO has the lower free energy of formation than MnS, and acts so as not to inhibit the melting of the brazing filler material. Further, the formation of the oxide film containing MnO on the surface of the sintered compact of the brazing filler material in advance can inhibit the S component from the atmosphere and the material to be bonded from reacting with Mn of the brazing filler material in the heat treatment process, and can suppress the formation of MnS.

The oxide film may be formed on an entire surface of the sintered compact or may be formed on a partial surface. The formation of the oxide film on the surface of the sintered compact can suppress the formation of MnS during the heat treatment process, and thus, it is preferable that the oxide film is formed on the surface by accounting for 80 to 100% by area of the entire surface of the sintered compact.

The thickness of the oxide film is not particularly limited, and can be appropriately adjusted depending on a size, a shape, a composition and the like of the sintered compact. The formation of the oxide film can suppress the formation of MnS even if the oxide film is thin, and enables the acquisition of the same effect even if the oxide film is thick.

As described later, the oxide film can be formed by applying the heat treatment to the sintered compact in the oxidizing atmosphere and oxidizing the sintered compact. Such the oxide film can cover the entire surface or the partial surface of the sintered compact. Such the oxide film is formed on the surface of the sintered compact with an appropriate thickness, and can act to suppress the reaction of the metal component in the sintered compact with the S component from the atmosphere, the member to be bonded or the like during the heat treatment process.

In the brazing filler material according to one embodiment, the oxygen concentration preferably accounts for not less than 0.1% by mass of the total amount of the brazing filler material. The total amount of the brazing filler material is the total amount of the sintered compact and the oxide film.

In the brazing filler material according to one embodiment, the oxide film contains a large amount of O, and thus, the oxygen concentration can be contained in the brazing filler material by accounting for not less than 0.1% by mass of the total amount of the brazing filler material. Accordingly, it is possible to suppress the reaction of the S component from the atmosphere, the member to be bonded or the like with the metal component in the brazing filler material, particularly Mn during the heat treatment process, and can prevent the formation of sulfide which raises the melting point of the brazing filler material.

The oxygen concentration preferably accounts for not less than 0.1% by mass of the total amount of the brazing filler material, more preferably accounts for not less than 0.13% by mass of the total amount, still more preferably accounts for not less than 0.14% by mass of the total amount, and may account for not less than 0.15% by mass of the total amount.

O which remains in the sintered compact as the raw material may act to inhibit the sinterability of the sintered compact. If the oxide film becomes thick, a problem may be caused that the energy required for melting the central part of the sintered compact becomes large. Therefore, the oxygen concentration may be preferably limited to account for not more than 0.5% by mass of the total amount of the brazing filler material, more preferably account for not more than 0.4% by mass of the total amount, still more preferably account for not more than 0.3% by mass of the total amount, and may account for not more than 0.2% by mass of the total amount.

For example, the oxygen concentration preferably accounts for 0.1 to 0.5% by mass of the total amount of the brazing filler material, more preferably accounts for 0.13 to 0.4% by mass of the total amount, still more preferably accounts for 0.14 to 0.3% by mass of the total amount, and may account for 0.15 to 0.2% by mass of the total amount.

The oxygen (O) concentration of the brazing filler material can be measured in the same manner as the oxygen (O) concentration in the sintered compact of the above described brazing filler material.

The oxide film of the brazing filler material contains a large amount of O derived from the oxide.

In the brazing filler material, it is preferable that the amount of O in the oxide film of a surface layer part is larger than the amount of O of the sintered compact at the central part.

In the brazing filler material, a mass ratio (A/B) of the amount of oxygen A of the surface layer part relative to the amount of oxygen B at the central part is preferably not less than 1, particularly preferably exceeding 1, more preferably not less than 1.3, and still more preferably is not less than 1.5.

The surface layer part of the brazing filler material is a layer including the oxide film formed on the surface of the sintered compact, and the central part of the brazing filler material is the central part of the sintered compact.

Physical properties of the brazing filler material are described below. The physical properties of the brazing filler material are those of the brazing filler material containing the oxide film. The physical properties of the sintered compact of the brazing filler material are those of a sintered compact not formed with the oxide film yet.

The melting point of the brazing filler material is preferably in a range of lower than a sintering temperature of the member to be bonded. If the melting point of the brazing filler material is in the range of lower than the sintering temperature of the member to be bonded and also close to the sintering temperature of the member to be bonded, it is possible to perform the sintering of the member to be bonded and the bonding of the member by brazing in the same heat treatment process. Specifically, the melting point of the brazing filler material is preferably in a range from 900 to 1100° C. in accordance with the sintering temperature of the member to be bonded.

The melting point of the sintered compact from which the oxide film is excluded is used for the melting point of the brazing filler material. The oxide film of the brazing filler material has a higher melting point than the sintered compact, but the oxide film is thin, and therefore, if the sintered compact starts melting at a temperature equal to or lower than the melting point of the oxide film, the oxide film can be broken and the content inside the sintered compact can come to be flown out.

A specific surface area of the brazing filler material is preferably not more than 650 $cm^2/g$ with the oxide film being formed.

A specific surface area of the sintered compact to which the oxide film is not formed yet is preferably not more than 500 $cm^2/g$.

By reducing the specific surface area of the brazing filler material or the sintered compact, the materials are less likely to be affected by the oxidation, sulfidizing or the like from the atmosphere, the member to be bonded or the like.

The specific surface area of the brazing filler material can be adjusted by heat treatment conditions during forming the oxide film. The specific surface area of the sintered compact can be adjusted by the sintering temperature, especially the sintering temperature during liquid phase sintering a green compact.

Each of the specific surface areas of the brazing filler material and the sintered compact can be measured based on a BET method of a gas absorption method.

The sintered compact of the brazing filler material is preferably a dense body. By sintering the compact through a liquid phase during sintering, pores contained inside the sintered compact can be reduced. The sintered compact of the brazing filler material preferably has not more than 10% of a porosity.

A method for producing the brazing filler material for bonding iron-based sintered member according to one embodiment is described below. The brazing filler material for bonding iron-based sintered member according to one embodiment is not limited to a brazing filler material produced based on the following producing method.

The method for producing the brazing filler material according to one embodiment may include a process of preparing the sintered compact and a process of applying an oxidation treatment to the sintered compact.

In one example of the process of preparing the sintered compact, a green compact can be prepared by compacting a raw material powder, and the heat treatment can be applied to the green compact in a non-oxidizing atmosphere.

As a raw material powder, a mixed powder in which each raw material is blended so as to have a composition of the above described sintered compact can be used. For example, a mixed powder containing a Cu raw material, a Mn raw material, and a Ni raw material can be used. An alloy powder such as a Cu—Ni—Mn based alloy powder may be used as the raw material powder to be blended into the mixed powder. A Fe raw material may be further added to the mixed powder in any manner.

Compacting may be performed based on a normal method. A compacting auxiliary agent may be added to the mixed powder for compacting. For the compacting auxiliary agent, a component that is thermally decomposed during applying the heat treatment to the green compact can be preferably used.

A heat treatment temperature of the green compact is preferably in a temperature range in which the metal component of the mixed powder is melted and sintered, and more preferably in a temperature range in which the metal component of the mixed powder is melted and liquid phase sintered. Specifically, the heat treatment (melting) temperature of the green compact is preferably in a range from 980 to 1200° C. The heat treatment temperature is more preferably not less than 1000° C., and may be not less than 1100° C. depending on the composition or the like of the green compact. When a surface temperature of the green compact or a temperature in the furnace reaches the heat treatment temperature, a heat treatment time is preferably in a range from 1 to 180 minutes, and more preferably in a range from 10 to 60 minutes.

It is preferable if the heat treatment is applied to the green compact in the non-oxidizing atmosphere in order to promote the sintering of the metal components of the mixed powder. Examples of the non-oxidizing atmosphere include ammonia decomposition gas, hydrogen gas, nitrogen gas, vacuum atmosphere, and the like. The mixed gases thereof may be used.

The sintered compact with a low porosity can be obtained by applying the heat treatment to the green compact in the non-oxidizing atmosphere to promote the sinterability. The non-oxidizing atmosphere acts so that no oxide remains inside the sintered compact, and also acts so that no oxide film is formed on the surface of the sintered compact.

In one example of the oxidation treatment process, the heat treatment can be applied to the sintered compact in the oxidizing atmosphere.

The heat treatment temperature of the sintered compact is preferably in a range of a temperature that is lower than the melting point of the sintered compact and in a temperature range in which the metal component of the sintered compact and oxygen in the atmosphere are bonded to form the oxide film. Specifically, the heat treatment temperature of the sintered compact is preferably in a range from 500 to 900° C., and more preferably in a range from 600 to 900° C. In the state in which the surface temperature of the sintered compact or the temperature in the furnace reaches the heat treatment temperature, the heat treatment time is preferably in a range from 1 to 180 minutes, and more preferably in a range from 10 to 60 minutes.

By applying the heat treatment to the sintered compact in the oxidizing atmosphere, the oxide film can be formed on the surface of the sintered compact. Examples of the oxidizing atmosphere include an atmosphere, an endothermic atmosphere and the like. The mixed gases thereof may be used.

The process of preparing the sintered compact by applying the heat treatment to the green compact in the non-oxidizing atmosphere and the process of forming the oxide film by applying the heat treatment to the sintered compact in the oxidizing atmosphere may be performed independently or continuously.

For example, the sintered compact can be obtained by performing the first heat treatment, and after cooling, the oxidation treatment of the sintered compact can be performed at the second heat treatment process by changing the atmosphere or changing the furnace. Further, by using a continuous furnace, the sintered compact can be obtained by performing the heat treatment in a first section and the oxidation treatment of the sintered compact can be performed at the heat treatment process in a second section. By switching an atmosphere between the first section and the second section, the heat treatment can be performed continuously without setting a cooling process between the first section and the second section.

A method for brazing the member to be bonded by using the brazing filler material according to one embodiment is described below.

Not less than two members to be bonded as brazing targets preferably include at least one member selected from an iron-based green compact, an iron-based temporary sintered compact, and an iron-based sintered compact. The iron-based green compact and the iron-based temporary sintered compact can be provided as an iron-based sintered member after brazing by sintering them through the heat treatment during brazing.

The iron-based sintered member can be obtained by compacting the raw material powder containing iron as a main component to prepare the green compact and by applying the heat treatment to the green compact. The iron-based sintered member is produced by using the raw material powder, and therefore, pores derived from the raw material powder are formed inside the iron-based sintered member after sintering. If some extent of the brazing filler material is infiltrated in the pores of the iron-based sintered member, the bondability can be further improved. On the other hand, if the fluidity of the brazing filler material in the molten state becomes high, the amount of the brazing filler material infiltrated into the pores of the iron-based sintered member may increase, and the amount of the brazing filler material at the brazing site may decrease, which may raise a problem of the decrease of the bondability.

In one example of the brazing method, the brazing filler material is arranged at the brazing sites of the iron-based green compacts and compacts of two members, and then, by performing the heat treatment (sintering), the iron-based green compact can be sintered to obtain the iron-based sintered compact, and the brazing filler material can be melted to bond the two members. In such a method, the heat treatment temperature is preferably in a range of a temperature in which the iron-based green compact is sintered. Further preferably, the heat treatment temperature is limited to some extent to prevent that the brazing filler material is melted and the amount of the brazing filler material infiltrated into the pores of the iron-based green compact becomes excessive. Specifically, the heat treatment (sintering) temperature is preferably in a range from 1050 to 1200° C. The heat treatment temperature is more preferably not less than 1100° C. and may be not less than 1120° C. depending on the composition of the iron-based green compact, the composition of the brazing filler material and the like. In the state in which the surface temperature of the iron-based green compact or the temperature in the furnace reaches the heat treatment temperature, the heat treatment time is preferably in a range from 1 to 180 minutes, and more preferably in a range from 10 to 60 minutes. The heat treatment may be performed in the oxidizing atmosphere or the non-oxidizing atmosphere, but the non-oxidizing atmosphere is preferable.

In such a method, the iron-based temporary sintered compact may be used instead of using the iron-based green compact.

In another example of the brazing method, the brazing filler material is arranged on the brazing sites of the iron-based sintered compacts of two members that are sintered in advance, and then the heat treatment is performed to melt the brazing filler material and bond the two members. In such a method, the iron-based sintered compact is sintered in advance, and thus, bonding can be performed by the heat treatment with a relatively low temperature for brazing. In such a method, the heat treatment temperature is preferably in a range of a temperature in which the brazing filler material can be melted and the two members can be bonded. Specifically, the heat treatment (sintering) temperature is preferably in a range from 1050 to 1200° C. The heat treatment temperature is more preferably not less than 1100° C. and may be not less than 1120° C. depending on the composition of the iron-based sintered compact, the composition of the brazing filler material and the like. In the state in which the surface temperature of the iron-based sintered compact or the temperature in the furnace reaches the heat treatment temperature, the heat treatment time is preferably in a range from 1 to 180 minutes, and more preferably in a range from 10 to 60 minutes. The heat treatment may be performed in the oxidizing atmosphere or the non-oxidizing atmosphere, but the non-oxidizing atmosphere is preferable.

For example, when the brazing sites of the two members are plain surfaces that face each other, the brazing filler material may be arranged on an interface between the plain surfaces. The brazing filler material can also be arranged in the vicinity of the interface so that the brazing filler material may be infiltrated into the interface when the brazing filler material melts.

When one component is a plain surface and the other component has a through-hole part, the brazing filler material can also be arranged in the through-hole part of the other component in a state where the two members are combined. In such a way, brazing can be performed by infiltrating the brazing filler material from the through-hole part to the interface between the two members when the brazing filler material is melted.

When one component is a plain surface, and the other component has a recessed part, the brazing filler material can be arranged in the recessed part of the other component, and then one component can be arranged to cover the recessed part of the other component. In such a way, brazing can be performed by infiltrating the brazing filler material from the recessed part to the interface between the two members when the brazing filler material is melted.

EXAMPLES

The present invention is described below with reference to a series of examples. The present invention is not limited by the following examples.

Production Example 1

Table 1 shows an oxidation temperature and an oxygen concentration of the brazing filler material.

"Preparation of Brazing Filler Material"

A brazing filler material powder with the following composition was prepared by blending 85.5% of a powder containing 40% by mass of Cu, 15% by mass of Mn, 1.5% by mass of Si, 1.5% by mass of B, and a remainder of Ni with 14.5% of Fe powder.

34.2% by mass of Cu, 12.8% by mass of Mn, 14.5% by mass of Fe, 1.54% by mass of Si, 1.28% by mass of B, and a remainder of Ni.

A predetermined amount of the brazing filler material powder was weighed so that the weight of each sintered compact became 0.66 g and compacting was performed. The obtained green compact was fired in an ammonia decomposition gas atmosphere at a temperature of 1120° C. for 30 minutes to obtain the sintered compact. During a firing process, the sintered compact became a spherical body with a diameter of about 6 mm.

Then, the heat treatment was applied to the sintered compact in an atmosphere at the oxidation temperature shown in Table 1 for 30 minutes. By this oxidation treatment, the surface of the sintered compact became black, and the oxide film was observed.

In Example 1, no oxidation treatment was performed. In Example 1, no oxide film was observed.

"Evaluation of Oxygen Concentration of Brazing Filler Material"

The oxygen concentration of the brazing filler material subjected to the oxidation treatment was evaluated.

The oxygen (O) concentration was measured based on a combustion infrared absorption method by using an oxygen analyzer "TC-600" produced by LECO JAPAN CORPORATION.

"Iron-Based Green Compact"

Figure 1A:
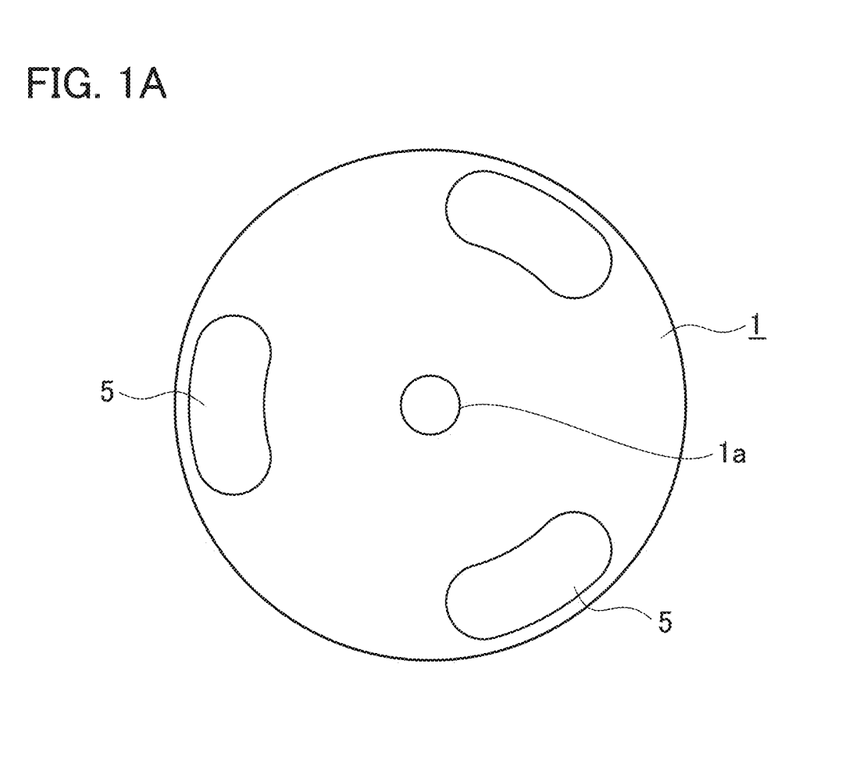
FIG. 1A is a top view of a lower member used in Examples.
Figure 1B:
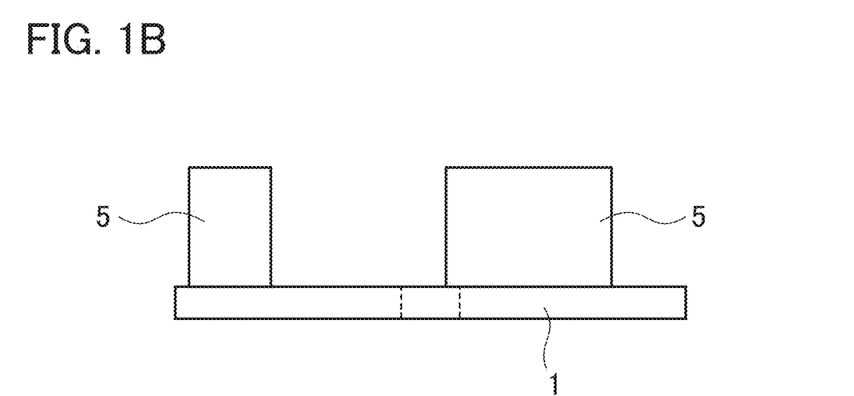
FIG. 1B is a side view of the lower member used in Examples.
Figure 2A:
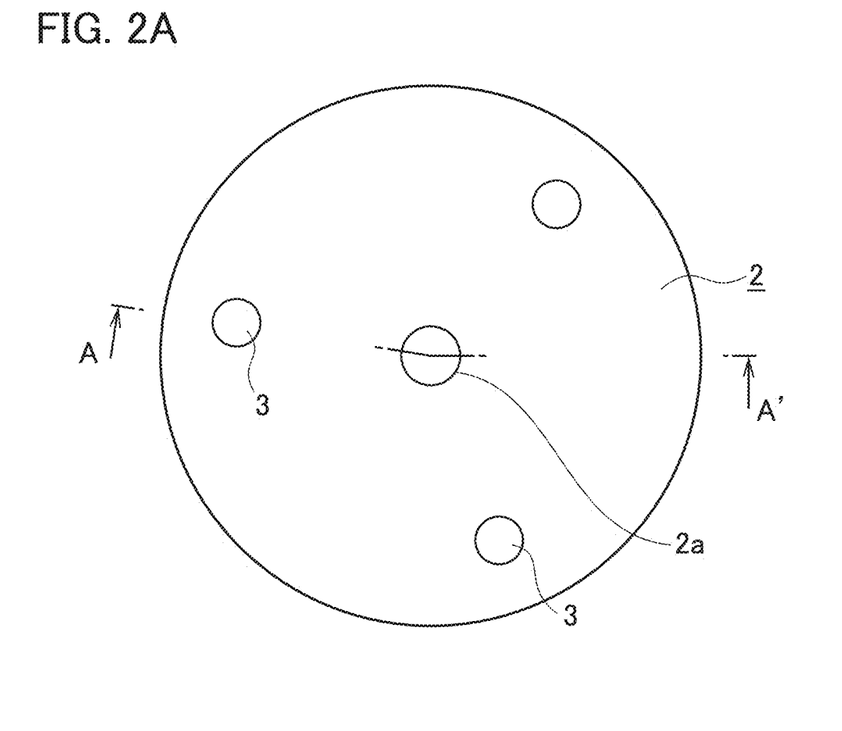
FIG. 2A is a top view of an upper member used in Examples.
Figure 2B:
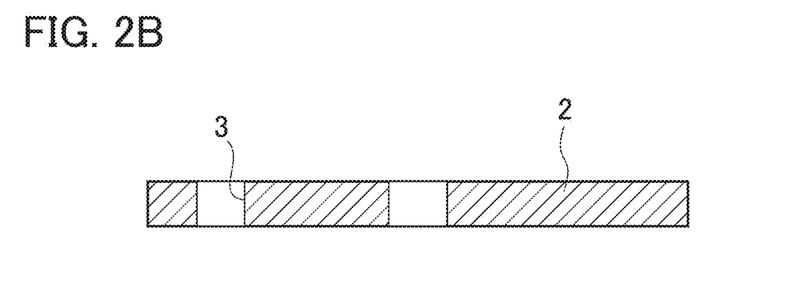
FIG. 2B is a cross sectional view of the upper member used in Examples.

FIGS. 1 and 2 show shapes of two members of the iron-based green compacts to be bonded by brazing. FIG. 1A is a plan view of a lower member, FIG. 1B is a side view of the lower member. FIG. 2A is a plan view of an upper member, and FIG. 2B is a cross sectional view of the upper member which is taken along line A-A'.

A lower member 1 with a diameter of 85 mm and a thickness of 3 mm has three columns 5 and a through-hole part 1a which is arranged at the center. Each of the three columns 5 has an upper surface area of 200 mm$^2$ and a height of 17 mm. The upper member with a diameter of 100 mm and a thickness of 10 mm has three through-hole parts 3 and a through-hole part 2a which is arranged at the center. Each of the three through-hole parts 3 has a diameter of 8 mm.

A mixed powder in which, to the iron powder, 1.5% by mass of copper powder and 1.0% by mass of graphite powder are added, is used as the raw material powder. The mixed powder was compacted at a density of 7.0 Mg/m$^3$ to prepare the iron-based green compact having the shape of the lower member as shown in FIG. 1. In the similar manner, the iron-based green compact was prepared to have the shape of the upper member shown in FIG. 2.

"Brazing"

Figure 3:
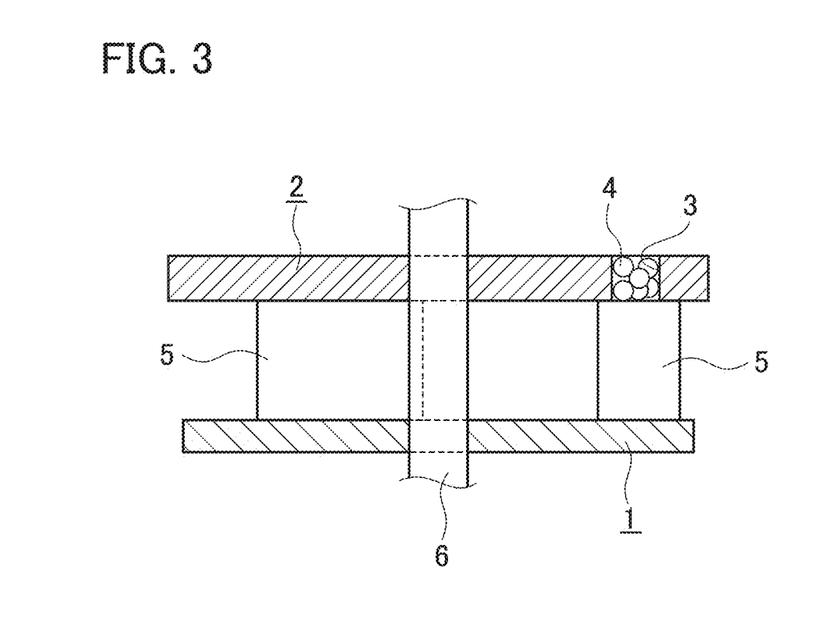
FIG. 3 is a cross sectional view showing a combined state of the upper and the lower member used in Examples.

As shown in FIG. 3, the lower member 1 and the upper member 2 of the iron-based green compact were combined, and an iron rod 6 covered with Al$_2$O$_3$ was inserted into the central through-hole part to prevent a position displacement. The through-hole part 3 of the brazing site was filled with the brazing filler material 4. In this state, the iron-based green compact was fired in the ammonia decomposition gas atmosphere at a temperature of 1130° C. for 30 minutes. By firing the iron-based green compact, the iron-based green compact was sintered to become an iron-based sintered compact, and the brazing filler material 4 was melted to braze the lower member 1 and the upper member 2.

"Evaluation of Bonding Area Ratio"

A bonding area ratio of the brazing site of the brazed iron-based sintered part was evaluated. The results are shown in Table 1.

An ultrasonic inspection was performed by setting the iron-based sintered part on a turntable, moving an ultrasonic sensor in a radial direction while rotating the iron-based sintered compact, and irradiating an upper surface of the brazing site with ultrasonic waves.

In the ultrasonic inspection of the brazing site, the reflection of the ultrasonic wave is different between a sufficiently brazed portion and a portion where brazing is insufficient, and thus, a brazed area relative to opposite surfaces of the two members can be confirmed.

Specifically, a ratio (% by area) of the brazed area to an area obtained by subtracting an area of the through-hole parts 3 of the upper member 2 from an area of the upper surfaces of the columns 5 of the lower member 1 was set as the bonding area ratio.

TABLE 1

| No. | Oxidation temperature (° C.) | Oxide film | Oxygen concentration (% by mass) | Bonding area ratio (%) |
|---|---|---|---|---|
| 1 | No oxidation treatment | Non | 0.110 | 40 |
| 2 | 500 | Exist | 0.140 | 75 |
| 3 | 600 | Exist | 0.142 | 80 |
| 4 | 700 | Exist | 0.148 | 90 |
| 5 | 750 | Exist | 0.152 | 100 |
| 6 | 800 | Exist | 0.164 | 100 |
| 7 | 850 | Exist | 0.171 | 100 |

As shown in Table 1, in Examples 2 to 7 where the brazing was performed by using the brazing filler material formed with the oxide film, the bonding area ratio was high, and the bonding was able to be performed preferably. As the oxygen concentration of the brazing filler material became high, the bonding area ratio became higher.

Figure 4A:
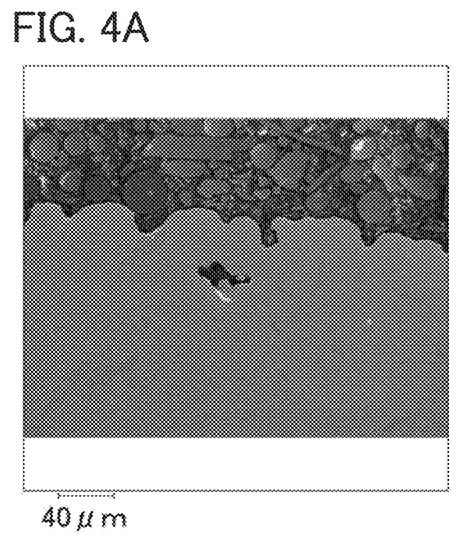
FIG. 4A is a cross sectional SEM image of a brazing filler material of Example 1.
Figure 4B:
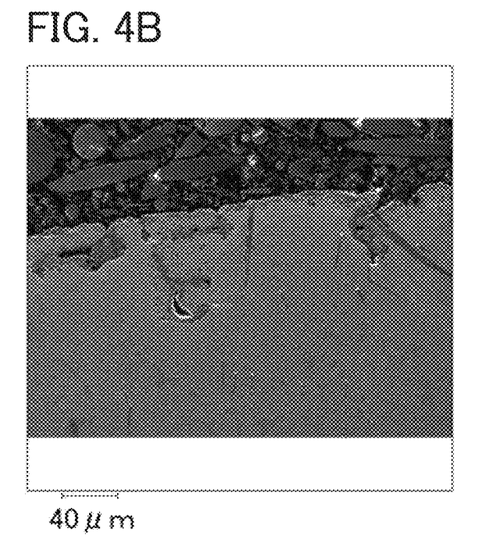
FIG. 4B is a cross sectional SEM image of a brazing filler material of Example 6.

Cross sectional SEM (scanning electron microscope) images of the brazing filler materials of Example 1 in which the oxidation treatment was not performed and Example 6 in which the oxidation treatment was performed are shown in FIGS. 4A and 4B, respectively. In FIGS. 4A and 4B, lower portions are sintered compact portions. In FIG. 4B, an oxide film layer was observed on a surface layer of the sintered compact portion.

A cross section of the brazing filler material of Example 6 was observed by using an electron beam microanalyzer "EPMA-1600" produced by Shimadzu Corporation, and an elemental analysis of the oxide film was performed. The results are shown in FIG. 5.

Figure 5A:
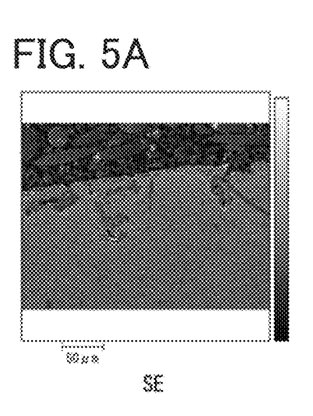
Figure 5B:
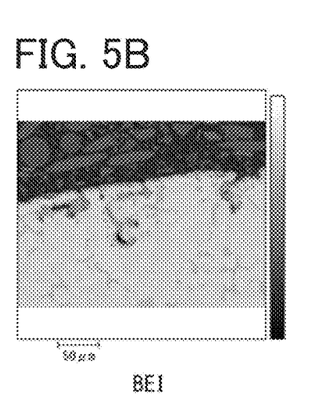

FIG. 5A shows a secondary electron (SE) image, and FIG. 5B shows a reflected electron (BEI) image. In each of A and B of FIG. 5, a scale on the right side indicates the contrast of the count number.

Figure 5C:
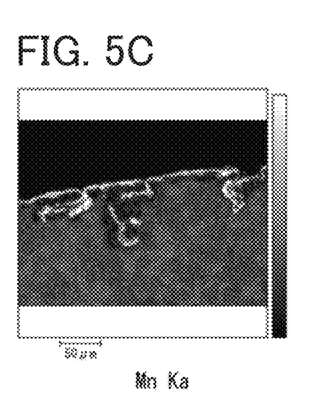
Figure 5D:
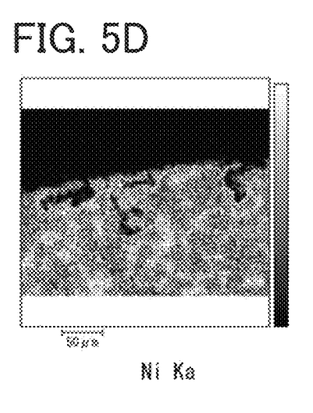
Figure 5E:
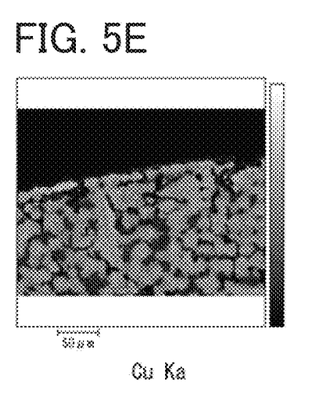
Figure 5F:
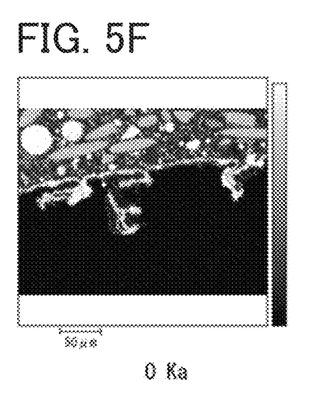

FIG. 5C shows an element analysis image of Mn, FIG. 5D shows an element analysis image of Ni, FIG. 5E shows an element analysis image of Cu, and FIG. 5F shows an element analysis image of O. In each of C to F of FIG. 5, a scale on the right side indicates the contrast of the count number. In each of C to F of FIG. 5, no element was observed in a black portion, but as a color became close to white from gray, elements of higher concentration were observed.

From FIG. 5, the large amount of Mn and O was observed in the surface layer of the brazing filler material, and it is estimated that a main component of the oxide film on the surface layer of the brazing filler material is MnO. Further, at inside of the brazing filler material, while Mn, Ni, and Cu were distributed in dendritic peripheral bases, no distribution of O was observed.

Production Example 2

The 85.5% of powder containing 40% by mass of Cu, 15% by mass of Mn, 1.5% by mass of Si, 1.5% by mass of B, and a remainder of Ni are blended with 14.5% by mass of Fe powder to prepare a brazing filler material powder having the following composition. 34.2% by mass of Cu, 12.8% by mass of Mn, 14.5% by mass of Fe, 1.54% by mass of Si, 1.28% by mass of B, and a remainder of Ni.

A predetermined amount of the brazing filler material powder was weighed so that the weight of each sintered compact became 0.66 g and compacting was performed. The green compact was fired in the ammonia decomposition gas atmosphere at a temperature of 1120° C. for 30 minutes to obtain the sintered compact. In the firing process, the sintered compact became a spherical body having a diameter of about 6 mm.

Then, the heat treatment was applied to the sintered compact in the atmosphere at a temperature of 800° C. for 30 minutes. After the oxidation treatment was performed, the surface of the sintered compact became black, and the oxide film was observed. In Examples 2 to 7 of Production example 1, the oxidation treatment was performed in an experimental small furnace, but in Example 8 of Production example 2, the oxidation treatment was performed in a large furnace for mass production and in a large case.

The oxygen concentration and the bonding area ratio were measured in the similar manner as in Production example 1 described above. The results are shown in Table 2. In Example 8, the oxygen concentration of the brazing filler material became high, and the bonding area ratio was high, and thus, the bonding was able to be performed preferably.

In Examples 2 to 7 of Production example 1 described above where the oxidation treatment was performed in the small furnace, the brazing filler materials were overlapped with each other, and oxygen is less likely to reach the brazing filler material, and thus, the oxygen concentration after performing the oxidation treatment was limited to some extent, but in Example 8 of Production example 2 where the oxidation treatment was performed in the large furnace, the brazing filler materials were less likely to overlap with each other, and thus, the oxygen concentration became high after the oxidation treatment was performed.

TABLE 2

| No. | Oxide film | Oxygen concentration (% by mass) | Bonding area ratio (%) |
|---|---|---|---|
| 8 | Exist | 0.406 | 100 |

The disclosure of the present application is related to the subject matter described in Japanese Patent Application No. 2018-190988 filed on Oct. 9, 2018, all of which are incorporated herein by reference.

It should be noted that various modifications and changes may be made to the above described embodiment without departing from the novel and advantageous features of the present invention other than those already described. Therefore, all such modifications and changes are intended to be included in the claims.

REFERENCE SIGNS LIST

1 Lower member, 2 Upper member, 3 Through-hole part, 4 Brazing filler material, 5 Column, 6 Iron rod.

The invention claimed is:
1. A brazing filler material for bonding iron-based sintered member, comprising:
    a sintered compact containing Cu, Mn, and a remainder of
       Ni and unavoidable impurities; and an oxide film formed on a surface of the sintered compact, the oxide film containing MnO, wherein an oxygen concentration of the brazing filler material accounts for not less than 0.13% by mass of a total amount of the brazing filler material; and wherein a specific surface area of the brazing filler material is not more than 650 cm$^2$/g.

2. A brazing filler material for bonding iron-based sintered member, comprising:

a sintered compact containing Cu, Mn, and a remainder of Ni and unavoidable impurities; and an oxide film formed on a surface of the sintered compact, the oxide film containing MnO, wherein an oxygen concentration of the brazing filler material accounts for not less than 0.13% by mass of a total amount of the brazing filler material; and wherein a mass ratio (A/B) of an amount of oxygen A of a surface layer part of the brazing filler material relative to an amount of oxygen B at a central part of the brazing filler material is not less than 1.

3. The brazing filler material for bonding iron-based sintered member according to claim 2, wherein a mass ratio (A/B) of an amount of oxygen A of a surface layer part of the brazing filler material relative to an amount of oxygen B at a central part of the brazing filler material exceeds 1.

4. The brazing filler material for bonding iron-based sintered member according to claim 2, wherein a mass ratio (A/B) of an amount of oxygen A of a surface layer part of the brazing filler material relative to an amount of oxygen B at a central part of the brazing filler material is not less than 1.5.

5. A brazing filler material for bonding iron-based sintered member, comprising:

a sintered compact containing Cu, Mn, and a remainder of Ni and unavoidable impurities; and an oxide film formed on a surface of the sintered compact, the oxide film containing MnO, wherein an oxygen concentration of the brazing filler material accounts for 0.15 to 0.2% by mass of a total amount of the brazing filler material.

6. The brazing filler material for bonding iron-based sintered member according to claim 5, wherein the oxide film containing MnO on the surface of the sintered compact of the brazing filler material is formed in advance before bonding an iron-based sintered member.

7. A method for producing a brazing filler material for bonding iron-based sintered member according to claim 5, comprising:

preparing a green compact by using a mixed powder blended so as to have a composition of the sintered compact, preparing the sintered compact by applying a heat treatment to the green compact in a non-oxidizing atmosphere, and applying an oxidation treatment to the sintered compact by applying a heat treatment to the sintered compact in an oxidizing atmosphere.

8. A method for producing an iron-based sintered part, comprising:

providing the brazing filler material for bonding iron-based sintered member according to claim 5, and producing an iron-based sintered part comprising a plurality of iron-based sintered members bonded by using the brazing filler material.

9. The method for producing an iron-based sintered part according to claim 8, wherein the oxide film of the brazing filler material containing MnO on the surface of the sintered compact of the brazing filler material is formed in advance before bonding the iron-based sintered member.

* * * * *